Sept. 27, 1932.  E. N. MOLITOR  1,879,813
TREE PROTECTOR
Filed Aug. 26, 1929
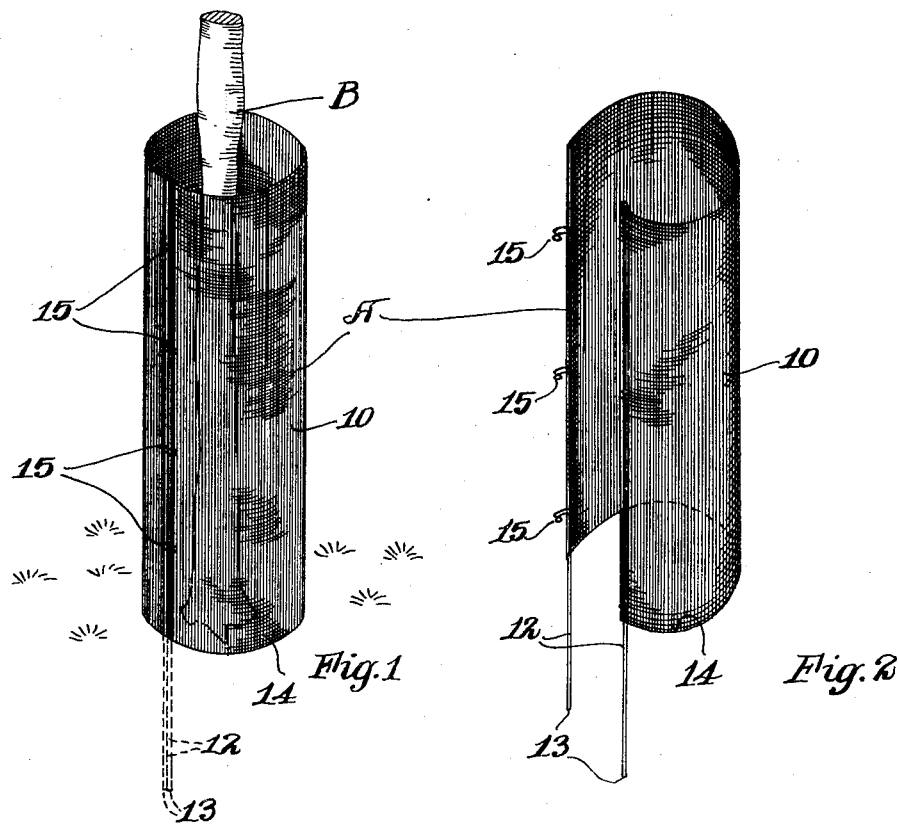
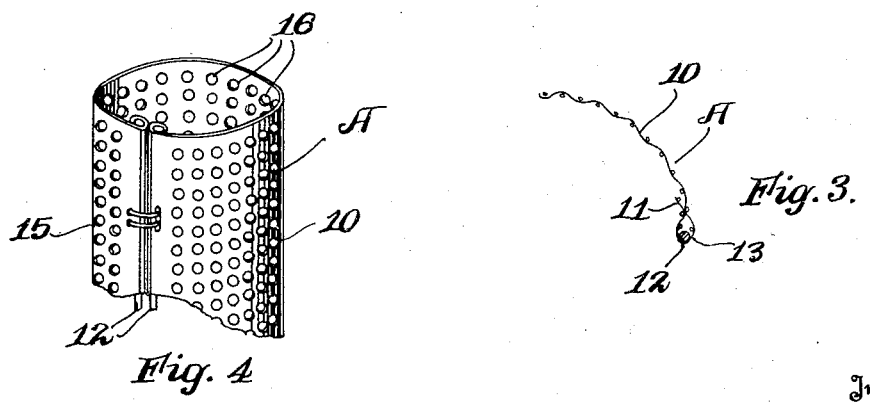
Inventor
Eugene N. Molitor
By Howard Pieher
Attorney Patented Sept. 27, 1932

1,879,813

UNITED STATES PATENT OFFICE

EUGENE N. MOLITOR, OF ST. PAUL, MINNESOTA

TREE PROTECTOR

Application filed August 26, 1929. Serial No. 388,307.

This invention relates to a protector for trees and other plants having a simple construction, inexpensive to manufacture and therefore providing an economical means of protecting trees and plants. My protector will prevent overheating around the trees, blistering of the bark of the tree inside of the guard or protector, and also protecting the tree or plant against rabbits, mice or other rodents.

A feature of the invention resides in the securing of a metal mesh which forms the body of the guard rigidly to wire or metal stake members such as by spot welding or other suitable securing means, so that the stakes become virtually an integral part with the mesh body of the guard and project from one side of the same but extend flush with the other side. A further feature of the invention resides in a simple guard made of wire of the desired size wherein it is not necessary to provide transverse strengthening ribs or members owing to the integral unit-like structure wherein the anchoring stakes are virtually a part of the guard by integral connection therewith.

Further, my invention includes a guard having securing means in the form of a series of hook members which are secured at the anchor stakes so that the hooks may engage through the mesh about the adjacent stake and in this manner I provide means of attaching the edges of the guard so that the guard may be easily placed about a tree or plant by inserting the stakes into the ground adjacent each other and after the stakes are pressed into the ground the guard may be wrapped about the tree and at the same time hooked together to form an annular protection about the trunk of the tree which is primarily essential in young growing plants and trees.

The integral or unitary structure of my protector is of primary importance and provides a tree guard or protector which can be made very economically and yet having a nature which is strong and secure to protect trees when placed about the same, particularly near the ground line. As an integral unit the guard or protector is more easily handled to place the same about a tree. In carrying out the primary feature of my guard in its unitary structure, the wire mesh is adapted to form the body of the protector while the raw ends of the same are wrapped about the securing or anchoring rods and spot welded or otherwise rigidly secured and fastened to the anchoring rods with one end of the rods projecting from the ends of the guard.

It is also a feature of my invention to provide a tree guard which may be made of sheet material having a series of holes punched therein to perforate the same and this sheet is adapted to form the body of the guard. In this structure the edges of the guard are wrapped about the rods which form the anchoring members for securing the guard in place about a tree or other plant. When the edges are wrapped about the rods which form the anchoring members of the guard in this structure they are rigidly secured to the stakes by spot welding or other suitable means so as to form an integral unitary structure in the same manner as when a wire mesh is used as hereinbefore described. It will be apparent that the body of the guard in each case is sufficiently strong to obviate the necessity of any transverse reinforcing or bracing means and thereby form with the anchoring rods at the edges a unitary economical structure of a very desirable nature.

All the features and objects will be more clearly defined in the specification and claims.

In the drawing forming part of this specification:

Figure 1 is a perspective view of my guard and protector as it would appear in use.

Figure 2 shows the guard in perspective ready for use and with the edges separated and showing the securing hooks.

Figure 3 is a diagrammatic sectional detail of a portion of the wire mesh as it would appear wrapped around one of the anchoring rods.

Figure 4 illustrates a detail perspective of the form of the guard when the body thereof is made of perforated sheet material.

I have illustrated in the drawing my tree guard or protector A for trees and plants which is adapted to encircle the trunk of the tree such as B, in a manner to protect the same at the ground line and as far up as may be desired. My guard A is very adaptable to be used with young growing nursery stock and the body portion 10 of the same may be formed of wire mesh of the desired size so that the sun rays may be broken up sufficiently to prevent scalding and blistering of the bark of the tree B and yet not so close as to cause heating inside of the guard.

The wire mesh 10 may be of any suitable nature such as a galvanized mesh or screening and the raw edges 11 of the body 10 may be wrapped about the anchoring stake 12 by the loop portion 13 of the mesh, as illustrated in Figure 3, and the raw edge 11 spot welded to the stake 12 and the body 10 in a manner so as to form an integral structure between the body 10 and the anchoring stake 12. Where a wire mesh is used for the body 10 of the guard A two anchoring stakes 12 are provided, each of which are secured so as to integrally connect the same with the mesh and thereby rigidly connecting the stakes to the body 10 of the guard A. The stakes 12 are formed with anchoring or projecting ends 13 which are adapted to project from the lower edge 14 of the guard A sufficiently so that the ends 13 of the stakes 12 may be anchored in the ground, as illustrated in Figure 1.

Along one of the edges in which the stakes 12 are secured I provide a series of fastening hooks 15 which may be made of wire or other suitable material. These hooks are secured in a manner so that the unitary structure of the guard A may be placed about the trunk B of the tree or plant with the ends 13 of the stakes 12 adjacent each other and then by pressing these projecting ends of the stakes 12 into the ground the guard A is simultaneously wrapped about the trunk B of the tree or plant and at the same time the hooks 15 are engaged over the adjacent rod 12 at the adjacent edge of the guard A and the hooks are then bent if desired to anchor the adjacent edges of the guard connected together as illustrated in Figure 1. This secures the guard A in a manner to extend annularly about the trunk B of the tree, thereby protecting the same against rabbits, mice and other rodents which are so detrimental to young growing nursery stock.

When the guard A is made as illustrated in Figure 4 with the body portion 10 made of perforated sheet material which may be a galvanized metal or other rust resisting material, the integral structure is such as to form a very firm and rigid guard. This form of guard is strong, durable and very desirable. The openings 16 in this form of the guard may of any desired size or nature so as to give the proper ventilation inside of the guard and small enough to protect the article about which the guard is placed.

In this structure illustrated in Figure 4, the anchoring rods 12 are secured by wrapping the edges of the body 10 about the same and spot welding the parts together or anchoring the stakes 12 and the body 10 to connect them integrally in any other suitable manner. The hooks 15 in this structure may be made of wire or other suitable material and are adapted to engage about the adjacent edges and around the rods 12 to securely fasten the guard A about the plant or tree as illustrated in Figure 1.

In the formation of my guard A it is essential that an economical structure be provided, otherwise an article of this nature is prohibitive for use because if it is of a complicated nature and expensive to manufacture, the nurseries cannot afford to use them, neither can they be readily sold to the trade. However, with the simple unitary structure herein disclosed and set forth I have found that a ready use and demand is apparent and an article of this nature is very desirable because of its value in protecting nursery stock, trees and other plants, particularly during the early period of their growth. The unitary structure permits the same to be used conveniently and is of primary importance because it provides a guard virtually in a single piece structure which may be easily attached and having no parts which will disengage one from the other, and thereby providing a very desirable guard. It will be apparent that this structure is important in forming and providing an economical guard of the nature hereinbefore set forth.

In accordance with the patent statutes I have described the principles of my guard and endeavored to illustrate the best embodiment thereof, however, it is obvious that the same may be carried out by other means and applied to uses other than those above set forth within the scope of the following claims to carry out the purposes and intent of the invention.

I claim:

1. An integral tree guard or protector comprising a perforated mesh-like one-piece body portion and a pair of anchoring rods, the ends of said body portion being severally wrapped around said anchoring rods and integrally and rigidly secured thereto, said anchoring rods projecting from one end of the said body portion, and a plurality of hook-like connecting members adapted to engage through the mesh about the adjacent rod to thereby connect said rods and the ends of said body portion to form an annular protector.

2. A tree guard or protector including, a meshed fabric body portion, a pair of anchoring rods for the ends of said body portion, loops formed by said body portion extending around said rods and spot-welded to said rods and said body portion to rigidly attach said rods to the free ends of said body portion, and hooks carried by one of said rods adapted to hook over the other of said rods through the mesh to close said protector around a tree.

3. A tree guard including, a perforated mesh-like body portion, anchoring rods for the free ends of said body portion, loops formed by bending the ends of said body portion about said rods, and anchoring the ends to the body and said rods by spot-welding, and hooks for closing said tree protector around a tree.

EUGENE N. MOLITOR.